United States Patent [19]

Yearick

[11] Patent Number: 5,273,382
[45] Date of Patent: Dec. 28, 1993

[54] MULTI-PURPOSE STAKE POCKET TIE-DOWN ANCHOR

[76] Inventor: Timothy A. Yearick, R.D. #1, Box D-136, Lock Haven, Pa. 17745

[21] Appl. No.: 943,031

[22] Filed: Sep. 10, 1992

[51] Int. Cl.$^5$ .............................................. F16B 13/06
[52] U.S. Cl. ........................................ 411/64; 411/78; 411/80
[58] Field of Search ............... 411/75, 76, 77, 78, 411/79, 80, 354.64, 24, 25, 348

[56] References Cited

U.S. PATENT DOCUMENTS

| | | | |
|---|---|---|---|
| 620,481 | 2/1899 | Moody | 411/79 |
| 1,311,038 | 7/1919 | Bowman | 411/77 X |
| 2,968,205 | 1/1961 | Springate | 411/348 |
| 3,101,641 | 8/1963 | Walker et al. | 411/348 |
| 4,773,803 | 9/1988 | Huegel et al. | 411/80 X |

FOREIGN PATENT DOCUMENTS

| | | | |
|---|---|---|---|
| 2305251 | 10/1976 | France | 411/24 |
| 134167 | 1/1952 | Sweden | 411/75 |

Primary Examiner—Rodney M. Lindsey
Attorney, Agent, or Firm—Thomas E. Sterling

[57] ABSTRACT

A tie down fitting adapted to fit within a stake hole in a side wall section of a pickup truck or other structure. The fitting includes a double wedge and heads dimensioned for insertion through the stake hole for engagement within the stake hole sides. A special threaded fastener lifts the double wedge separating the heads and forcing them against the stake hole sides. The fastener is designed to receive several threaded devices or various quick release pins for engagement by a cargo securing line or the like. A number of such fittings enable securement of cargo on the truck bed. When the threaded device or quick release pin is removed the fitting is recessed or hidden from view and does not interfere with other activities of the truck.

13 Claims, 6 Drawing Sheets

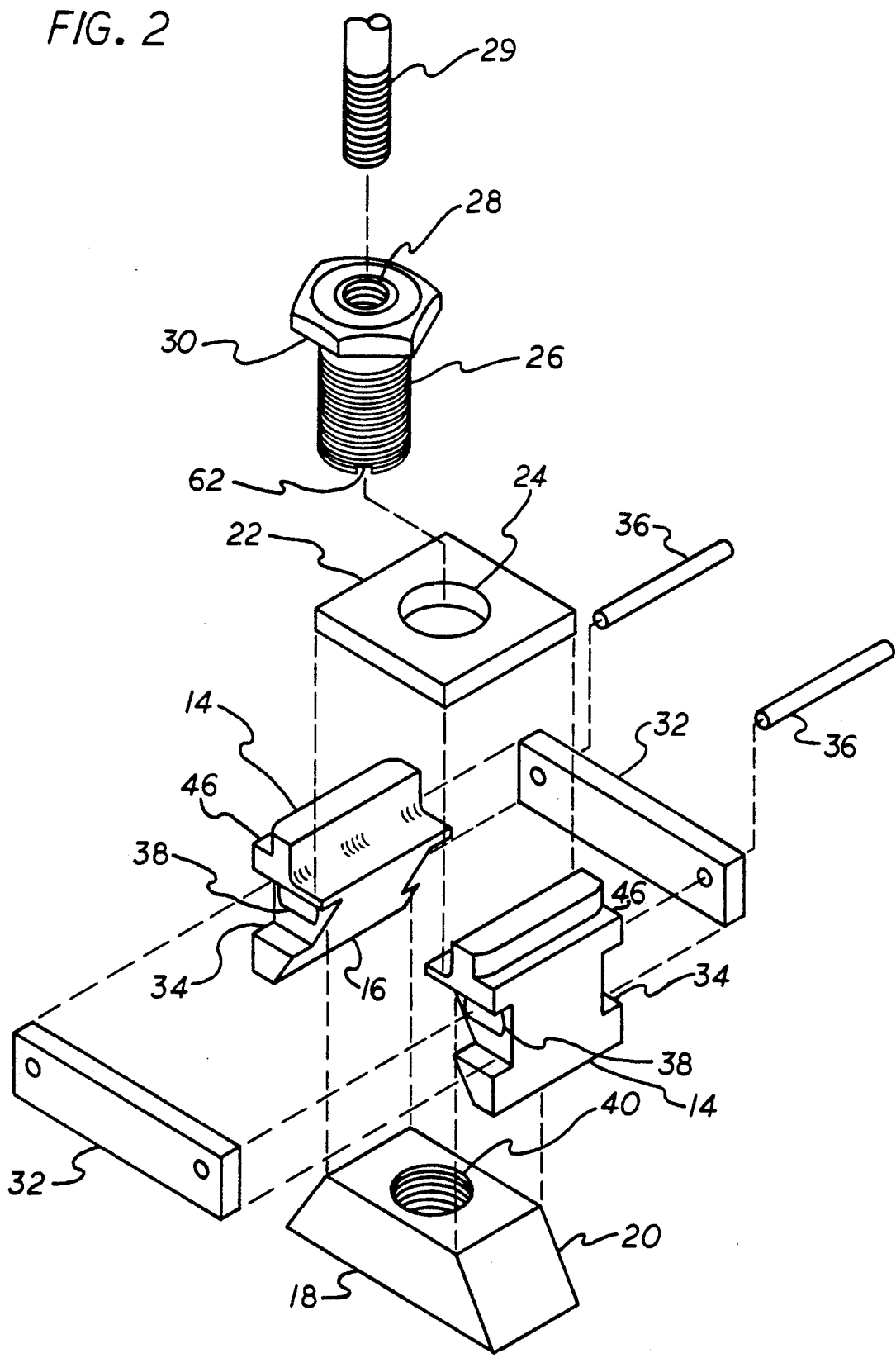

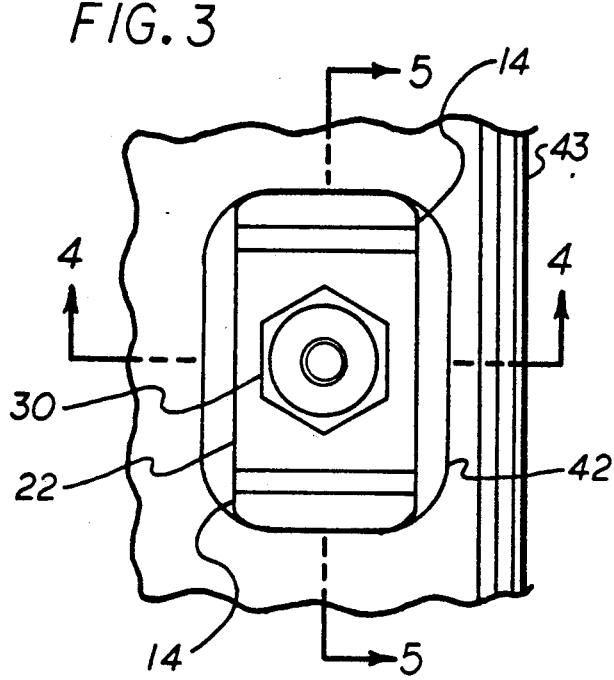
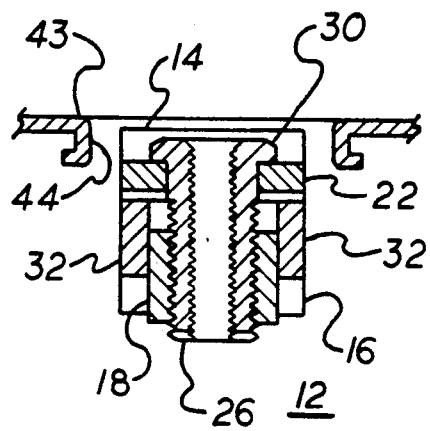
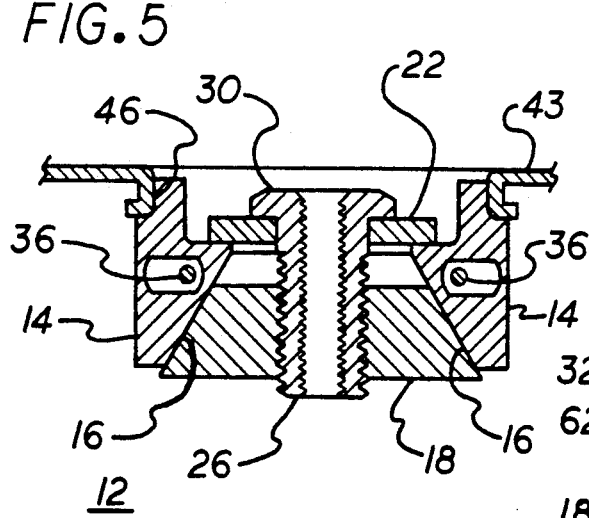
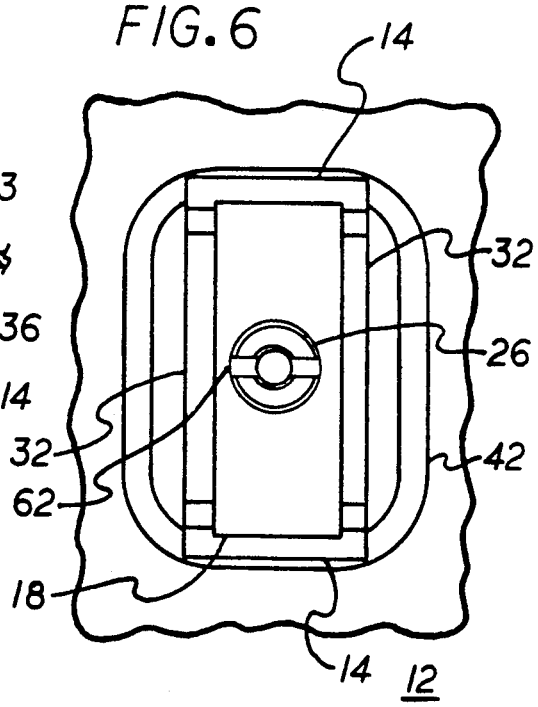

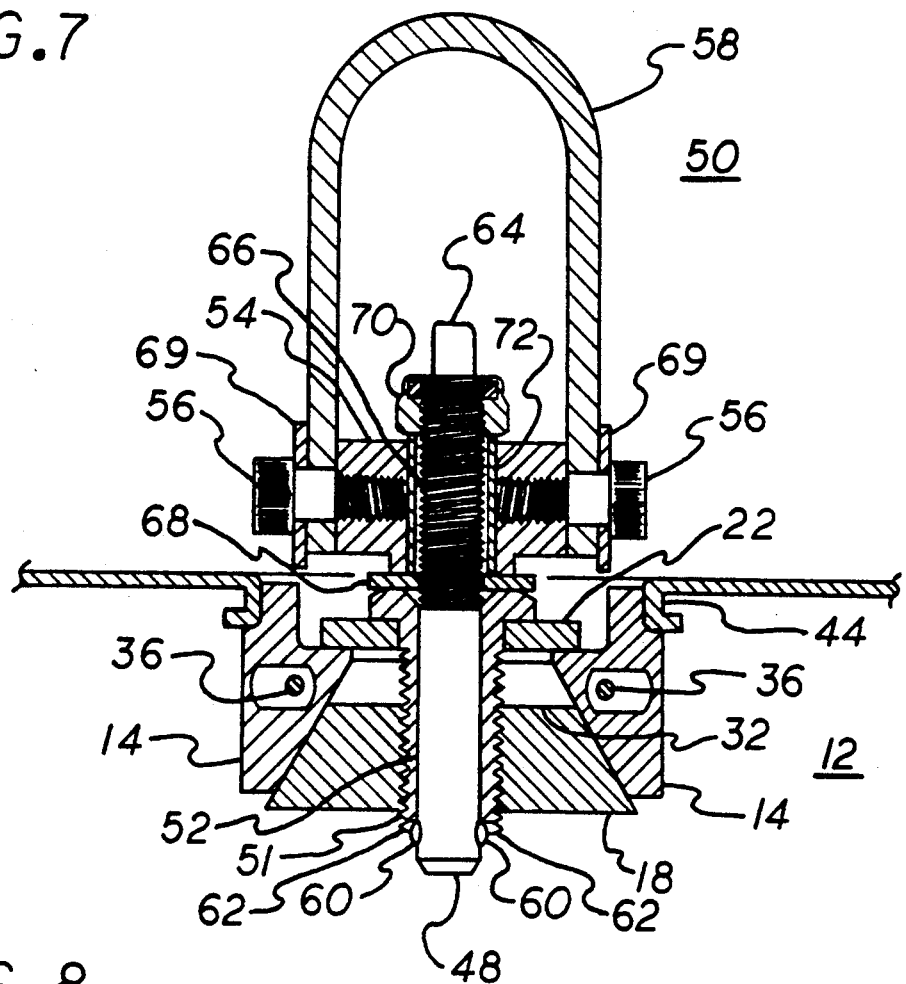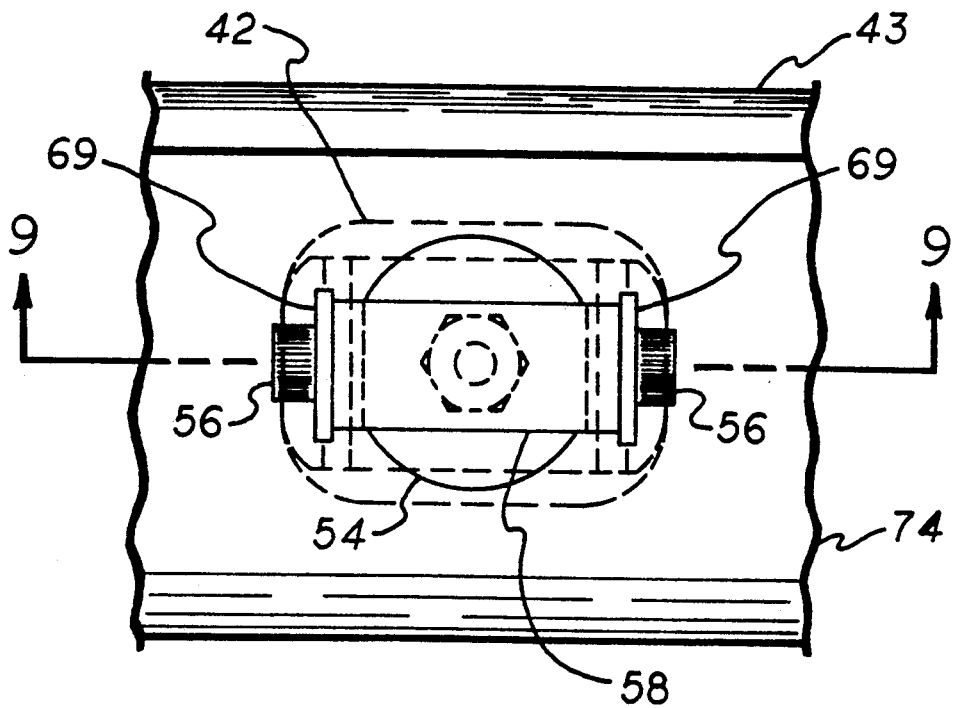

MULTI-PURPOSE STAKE POCKET TIE-DOWN ANCHOR

BACKGROUND OF THE INVENTION

1. Field of the Invention

This invention relates to a tie down fitting and more particularly to a recessed tie down assembly for removable mounting within a stake pocket of a pickup truck to aid in securing truck bed cargo, a camper top, bed liner, cross bed toolbox or other attachments.

2. Description of Prior Art

Tie down devices are available in two (2) categories. Category I includes various tie down devices located around the perimeter of the truck bed. Common tie down devices are in the form of an eye cleat, bracket, or hook fastener to the truck bed side wall utilizing screws or bolts which extend through openings specially drilled in the side wall. If bolts are used rather than screws, access to both sides of the side wall section is required.

It is impractical for a truck owner to remove such tie downs for use on another truck because of the semipermanent nature of the installation and because of the unsightly fastener openings which remain.

Category II encompasses various tie-down anchors located in the stake pockets of pickup trucks. These anchors generally are secured in the stake pockets with a clamping plate or expansion device to lock them in place. These anchors project above the truck body and have limited use due to the tightening function of the anchor.

Examples of Category I and Category II and other related inventions may be found in the following patents:

| | | |
|---|---|---|
| 4,607,991 | 3,351,356 | 744,559 |
| 4,657,299 | 3,840,250 | 2,625,861 |
| 3,623,690 | 3,841,660 | 4,027,867 |
| 3,595,125 | 3,351,356 | 4,387,845 |
| 4,607,991 | 3,421,726 | 4,505,010 |
| 3,241,501 | 4,815,787 | 4,643,411 |

This inventor is not aware of any other patents or publications disclosing prior art described in this patent application.

There is a need for a tie down fitting which can be quickly and removably fitted to a pickup truck side wall without any need for drilling or cutting of the wall. Preferably the fitting should be recessed in relationship to the mounting surface so that it is unobtrusive and out of the way when not in use.

There is also a need for a tie down assembly which also includes a securing or clamping assembly which is engagable with the frame of a camper top, bed liner, or other structure for securing these items in position upon the pickup truck side walls.

SUMMARY OF THE INVENTION

The fitting of this invention includes a centrally located double wedge, securing plate, and threaded fastener. The assembly comprises two (2) heads each having a clamping face on distal sides of the double wedge, and each having a wedge ramp face on the interior sides of each head. The heads are interconnected with opposing slide rails positioned in recesses in the heads and connected by pins inserted through a slot in the heads. In some pickup trucks the edge margins of the holes are reversely formed to provide a reinforcing bead, but in other trucks the four edge margins of each hole are downwardly deformed to provide flanges.

The fitting assembly is dimensioned for manipulation downwardly through the stake hole and into the inside of the side wall reinforcing bead or edge margin. Tightening the fastener lifts the double wedge forcing the heads outward locking the fitting to the edge bead or margin. The fastener is designed to accept several threaded devices or various quick release pins depending on the anchor application.

Included in this invention are several varieties of anchors which insert and lock to the tie fitting assembly. These involve rings or loops which extend above the stake hole. The rings or loops may be attached to a securing line. Also the anchor may be used to secure a bed liner or camper, or the like, to the top frame of the truck. The simplest of these anchors is a threaded anchor rod which screws into the tie down fitting assembly. The anchor rod may be attached to a line securing ring, a bed liner securing nut, or the like. Most convenient of the anchors employ a quick release pin which allows the anchor to be attached to the tie down fitting assembly by pressing a button and inserting the quick release pin. Such a quick release pin may be combined with a quick release swivel tie down anchor and a hand activated screw attachment.

The tie down fitting thus constitutes an inexpensive means for quickly providing a cargo securing, camper top, cross bed tool box or other attachment anchorage. There is no need for cutting or drilling special fastener holes in the truck side wall, and the fitting can be easily removed at any time for remounting on another truck if desired. When not in use the recess fitting is hidden from view and does not interfere with other uses of the truck. The fitting may be quickly and efficiently removed to allow the stake hole to be used for other applications.

The object of the invention is to provide a tie down fitting which can be mounted within the standard post or stake hole found in many current models of pickup trucks. Using the existing stake hole eliminates any need for specially drilled fastener openings in the truck side wall.

Another object of the invention is to provide a tie down fitting in the stake hole of a truck which is below the level of the stake hole and thus unobtrusive.

Still another object of this invention is to provide a tie down fitting which is easily installed and is easily removable.

Another object of this invention is to provide a tie down fitting which requires no drilling or cutting of a truck body.

Yet another object of this invention is to provide a tie down fitting to which a camper top, bed liner or other related devices may be easily secured to a truck body.

Another object of this invention is to provide an anchor which may be quickly attached or detached from the tie down fitting.

Another object of this invention is to provide an anchor having a quick release pin which is engagable with the tie down fitting.

Still another object of this invention is to provide a swivel type anchor which may be quickly installed or removed from a tie down fitting.

Still another object of this invention is to provide a tie down anchor that may be installed downwardly within a stake hole of a truck.

These and other objects of this invention will become apparent from consideration of the following description taken in combination with the accompanying drawings, in which:

DESCRIPTION OF DRAWINGS

FIG. 2 is a perspective exploded view of the tie down fitting assembly of FIG. 1.

FIG. 3 is a partial top plan view of a horizontal section of a truck side wall showing the tie down fitting assembly of FIGS. 1 and 2 installed in a stake hole of the truck.

FIG. 4 is a view taken along the line 4—4 of FIG. 3.

FIG. 5 is a view taken along the line 5—5 of FIG. 3.

FIG. 6 is a bottom plan view of the tie down fitting assembly of FIG. 3.

FIG. 7 is a cross sectional side view of quick release swivel tie down anchor installed in a tie down fitting assembly similar to that of FIG. 5.

FIG. 8 is a top plan view illustrating a bed liner or camper top frame mounted in position and clamped to a tie down fitting assembly using a quick release swivel tie down anchor.

DESCRIPTION OF THE PREFERRED EMBODIMENTS

Figure 1:
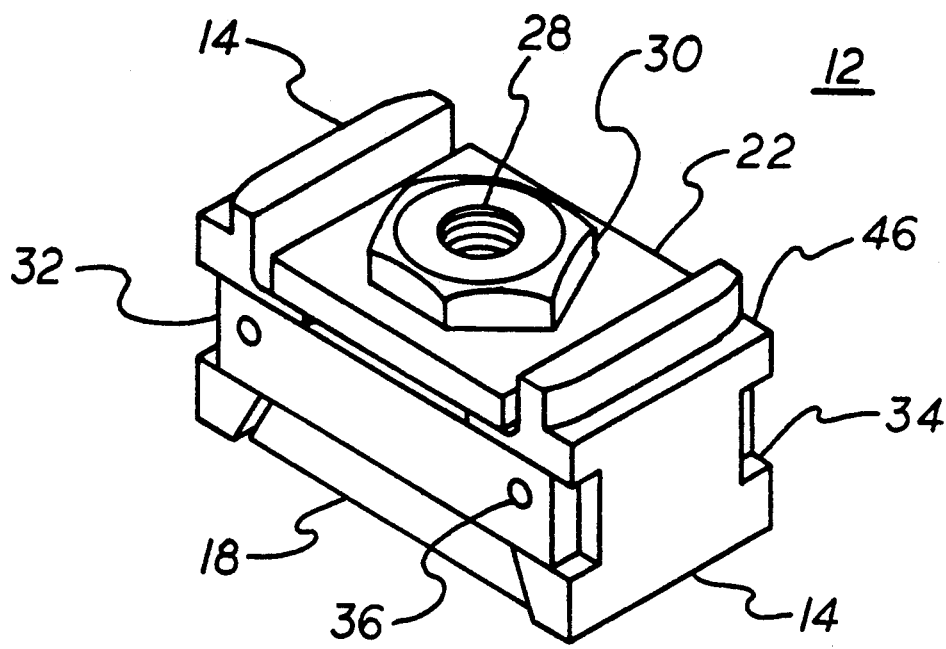
FIG. 1 is a perspective view of the tie down fitting assembly of the invention unattached to a truck or other object.

FIGS. 1 and 2 illustrate the tie down fitting assembly 12 of this invention unattached to the stake hole of a truck or other objects. The tie down fitting is comprised of two movable heads 14 having wedge shaped ramps 16 thereon. A double wedge shaped adjuster 18 has wedge shaped surfaces 20 thereon which abuts the wedge shaped ramps 16 on movable heads 14. A support plate 22 having a clearance hole 24 therethrough rests on both movable heads 14. A cylindrically shaped threaded fastener 26 extends through clearance hole 24. Threaded fastener 26 screws into a threaded hole 40 extending through double wedge shaped adjuster 18. Fastener 26 has an internally threaded fastener hole 28 therethrough and a hexagonal bolt head 30 on its end portion which bears against support plate 22. Ball slots 62 extend across the diameter of the end of fastener 26 for use when a quick release pin 48 (later described) is used. A threaded anchor rod 29 is threaded into internal fastener hole 28 and extends outwardly therefrom. Threaded anchor rod 29 may be attached to a ring or other securing devices (not shown) to which are tied straps, or to a bed liner securing nut or the like.

Two slide rails 32 are positioned in rail slots 34 on either side of movable heads 14. Two locking pins 36 extend through pin recesses 38 in each of movable heads 14. Locking pins 36 extend through slide rails 32 and are anchored thereto to retaining slide rails 32 in rail slots 34. Pin recesses 38 are of sufficient size to allow movable heads 14 to move outwardly and allowing slide rails 32 to slide in rail slots 34. As may be seen, when externally threaded fastener 26 is screwed into a threaded adjuster hole 40 in adjuster 18, the double wedge shaped surfaces 20 of adjuster 18 press against the wedge shaped ramps 16 on movable heads 14. Hexagonal bolt head 30 presses against support plate 22 forcing movable heads 14 apart.

FIGS. 3, 4, 5 and 6 illustrate the tie down fitting 12 of FIGS. 1 and 2 positioned in a stake hole 42 in the rear of a truck side 43. The stake hole 42 has flanges 44 on the edge portion thereof. The flange slots 46 in the outer portion of movable heads 14 engage the flange 44 on the inner side of the stake hole 42 locking movable heads 14 within stake hole 42. Thus by screwing fastener 26 into threaded hole 40, wedge shaped adjuster 18 forces movable heads 14 against flanges 44 locking the tie down fitting assembly 12 within the stake hole 42.

FIGS. 7, 8, 9, 10, 11 and 12 illustrate the tie down fitting assembly 12 installed in a stake hole 42 of a truck utilizing several types of tie down anchors. These anchors are attached to the tie down fitting assembly 12 by means of a quick release pin 48. FIGS. 7 and 8 illustrate a swivel tie down anchor 50 attached to the tie down fitting 12 by means of a quick release pin 48. Pin fastener 51 screws into a double wedge shaped adjuster 18 and has a smooth central bore hole 52 therethrough. Pin fastener 51 is similar to external threaded fastener 26 except it has a smooth central bore hole therethrough. Quick release pin 48 may be used with either threaded fastener 26 or pin fastener 51. When used with threaded fastener 26 the diameter of quick release pin is such that it passes through and does not engage the threads of internally threaded fastener hole 28.

Figure 9:
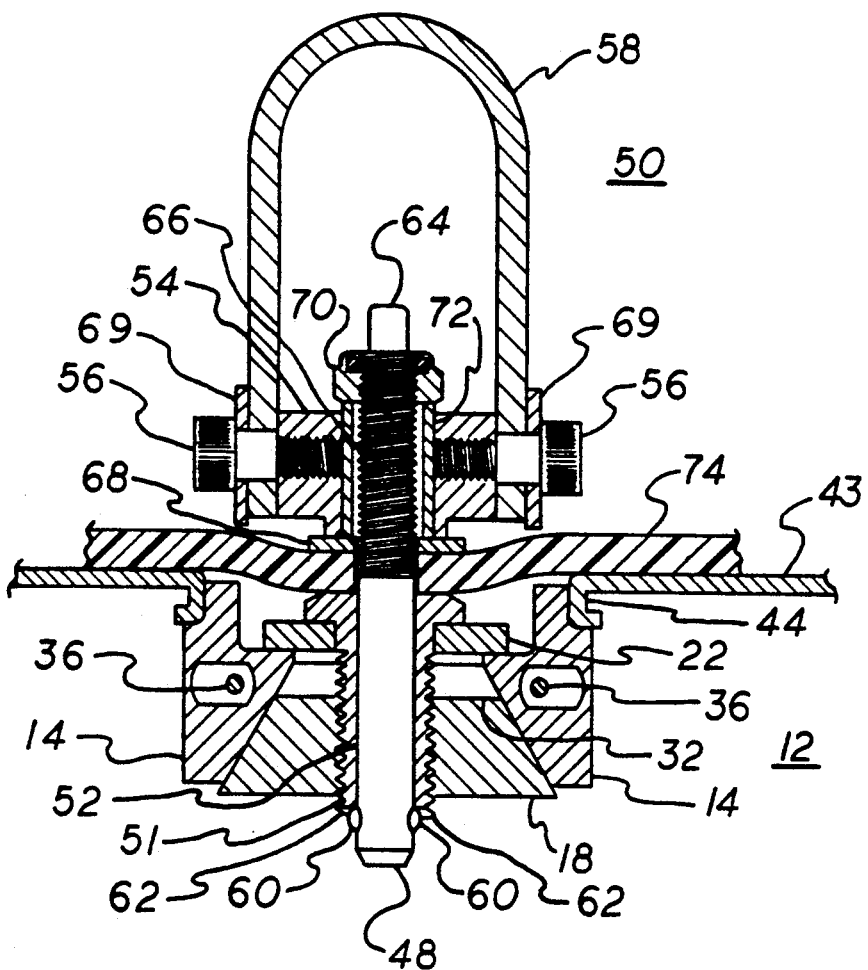
FIG. 9 is a view taken along line 9—9 of FIG. 8.

Referring to FIGS. 7, 8 and 9 the quick release swivel tie down anchor 50 is comprised of a swivel body 54 with two opposing threaded bolts 56 extending therein. Bolts 56 extend through a securing loop 58 and tension washers 69 attaching them to the swivel body 54. A quick release pin 48 extends through swivel body 54 and through pin fastener 51 and through the end of double wedge shaped adjuster 18. Locking balls 60 protrude from the lower lateral portion of quick release pin 48 and are engaged by ball slots 62 positioned along the diameter of the bottom portion of pin fastener 51. Quick release pin 48 is a generally available commercial type having a button 64 on the top thereof. Depressing button 64 causes locking balls 60 to retract within the quick release pin 48 allowing the quick release pin 48 to be withdrawn through pin fastener 51. Quick release pin 48 has pin threads 66 on the upper portion thereof. Quick release pin 48 extends through compression washer 68 on the upper portion of pin fastener 51. A locking nut 70 engages the pin threads 66 on quick release pin 48 and bears against a cylindrical compression sleeve 72 which extends from locking nut 70 to compression washer 68.

Swivel body 54 rotates about compression sleeve 72 allowing attached loop 58 to rotate. Thus as may be seen, pressure on quick release pin button 64 allows locking balls 60 to retract within quick release pin 48 permitting the swivel tie down anchor 50 to be withdrawn from tie down fitting assembly 12. Swivel tie down anchor 50 may be replaced quickly by depressing button 64 and reinserting quick release pin 48 into central bore hole 52. Releasing button 64 will cause locking balls 60 to lock in ball slots 62 resecuring the swivel tie down anchor 50 to tie down fitting assembly 12.

FIGS. 8 and 9 illustrate the swivel tie down anchor 50 extended through a bed liner 74 or a camper top frame 74 resting on stake hole 42 securing the bed liner 74 to the tie down fitting assembly 12.

Figure 10:
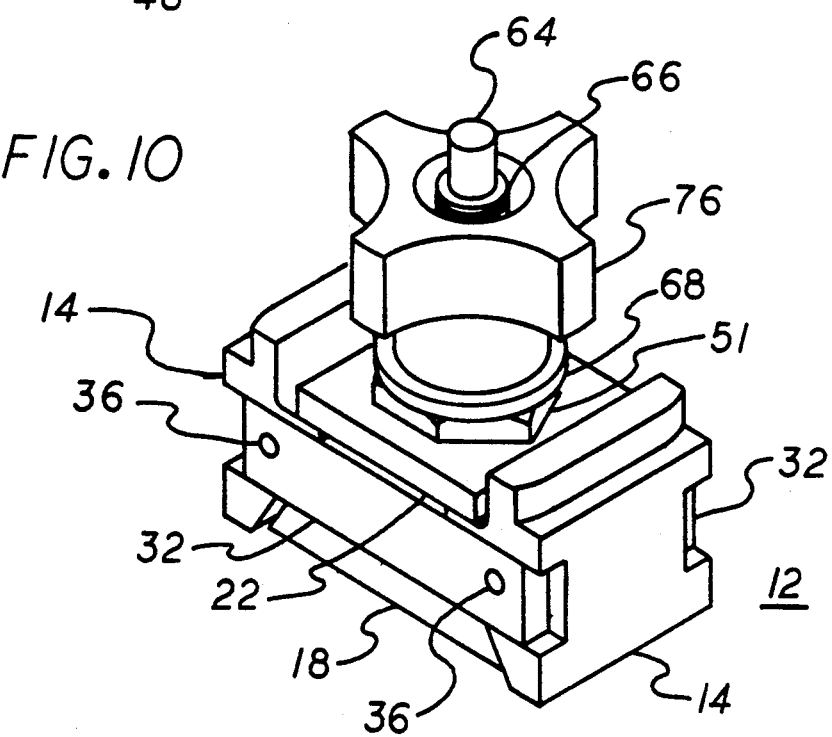
FIG. 10 is a pictorial view of an adjustable tie down assembly attached to a tie down fitting assembly which may be used for securing a camper to pin position above a truck side wall.
Figure 11:
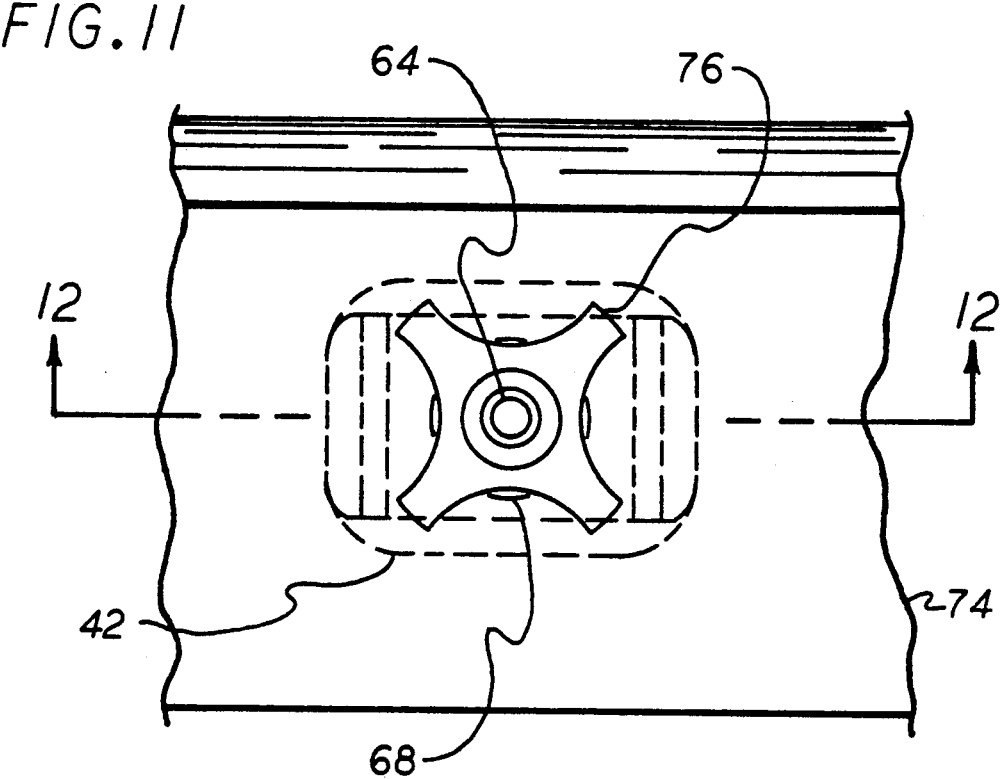
FIG. 11 is a top plan view of the clamping assembly of FIG. 10 mounted in position upon a camper top frame on a truck.
Figure 12:
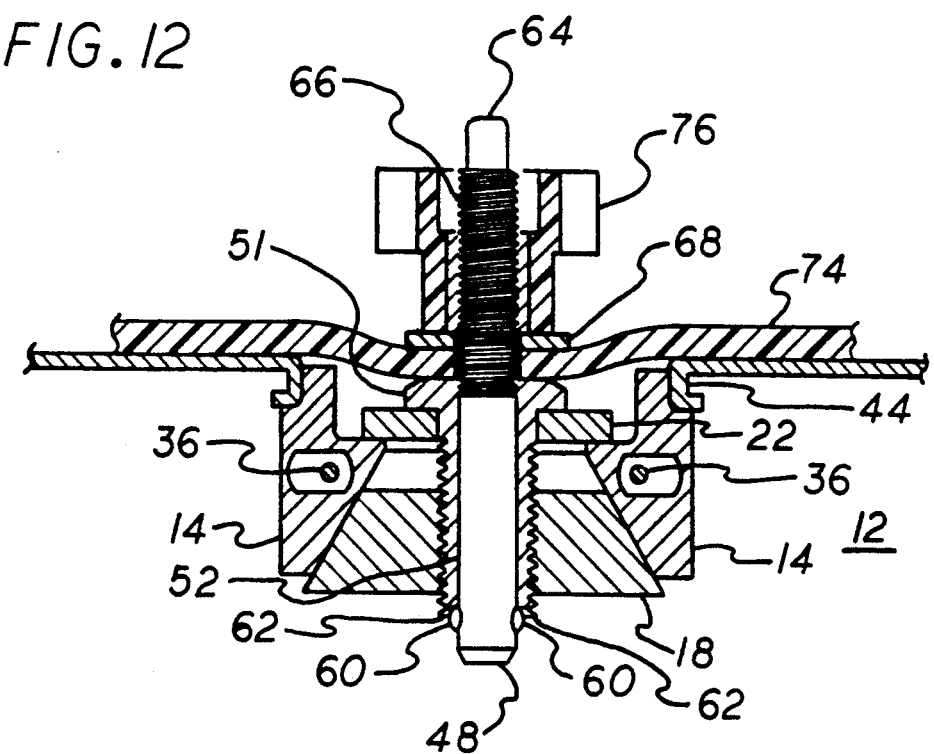
FIG. 12 is a view taken along line 12—12 of FIG. 11.

FIGS. 10, 11 and 12 illustrate another embodiment of the invention in which a bed liner 74 is secured to tie down fitting 12, anchored in a stake hole 42. The device utilizes a quick release pin 48 threadedly engaged with an internally threaded handle 76, the threads of which engage pin threads 66 of the quick release pin 48.

This embodiment is similar and operates and is numbered in a manner like that shown in FIGS. 7, 8 and 9. Button 64 of the quick release pin 48 is depressed and quick release pin 48 inserted through central bore hole 52 of pin fastener 51. Button 64 is then released forcing locking balls 60 to protrude and be engaged by the ball slots 62 in pin fastener 51. Quick release pin 48 extends through a hole in bed liner 74. Handle 76 is then screwed upon the pin threads 66 of quick release pin 48 until it presses against a compression washer 68 on the bed liner 74 locking it into position. The bed liner 74 may be released by unscrewing handle 76 slightly, pressing button 64 and pulling the quick release pin 48 out of the ball slot 62 of pin fastener 51.

Thus as may be seen, tie down fitting 12 equipped with the quick release pin device described in FIGS. 7-12 anchors a bed liner 74 or other attachments directly to a truck's stake hole 42. Likewise securing loops 58 may be utilized to attach a cargo line and at the same time to secure a bed liner 74 in position. It should be noted that in all uses the tie down fitting 12 is below the level of the stake holes 42 in the truck. Hence, it is out of the way and unobservable. The tie down fitting assembly 12 can be easily removed by unscrewing fastener 26 or pin fastener 51, causing movable heads 14 to move together releasing the anchoring pressure on flanges 44. It may be then installed in another stake hole.

This invention has been described with a certain degree of particularity. It should be noted, however, that various changes may be made in design without departing from the spirit of the invention.

I claim:

1. A tie down assembly adapted to be positioned within a stake hole of a vehicle, comprising in combination:
   a wedge shaped member with threaded hole therein, said wedge shaped member positionable and for contact within said stake hole;
   an expander head having a wedge shaped section in contact with said wedge shaped member and having clamping slots therein for contact with the edge of said stake hole;
   a support plate having a fastener opening therethrough, positioned in contact with said expander head;
   a fastener extending through said fastener opening in threaded engagement with said threaded hole in said wedge shaped member, said fastener having an anchor hole therein;
   a turnable head on said fastener in contact with said support plate;
   a slide rail positioned in rail slots in said expander head adapted to allow said slide rail to slide thereon;
   whereby turning said fastener will force said expander head outwardly against the edge of said stake hole.

2. The tie down anchor as claimed in claim 1, having two expander heads in contact with said wedge shaped member.

3. The combination as claimed in claim 2, having two slide rails positioned in rail slots adapted to allow said slide rails to slide thereon.

4. The combination as claimed in claim 3, having rail retaining pins connected to said slide rails and secured thereto.

5. The combination as claimed in claim 4, having a quick release pin in threaded connection with said anchor hole.

6. The combination as claimed in claim 5, having a ball slot in the end portion of said fastener.

7. The combination as claimed in claim 6, having said quick release pin releasably attached to said wedge shaped member and extending through said anchor hole through said fastener;
   a ball slot in the end portion of said fastener.

8. The combination as claimed in claim 7, in which said quick release pin in comprised of, in combination:
   a pin body;
   a release button on the end portion of said pin body;
   locking balls protruding from the lateral end portion of said pin body for retractable connection to said release button, said locking balls adapted to be retractably positioned within said ball slot.

9. The combination as claimed in claim 8, having a locking nut in threaded engagement with said quick release pin and in compression contact with said fastener.

10. The combination as claimed in claim 9, having a quick release swivel tie down anchor connected to said quick release pin.

11. The combination as claimed in claim 10, in which said quick release swivel tie down anchor is comprised of, in combination:
    a swivel body with a pin receiving open therethrough;
    a compression sleeve within said pin receiving opening, said quick release pin extending through said pin receiving opening and releasably connected to said fastener;
    a locking nut in threaded connection with said quick release pin and in contact with said compression sleeve, said compression sleeve in compression relationship with said fastener;
    a securing loop attached to said swivel body.

12. A tie down anchor adapted to fit in and be retained in an opening, comprising in combination:
    wedge shaped means positioned within said opening;
    expander means positionable and contactible with the periphery of said opening and having inclined surfaces in contact with said wedge shaped means;
    a slide rail positioned within slots in said expanded means;
    rail retainer means extending through said slide rail and secured thereto;
    support plate means positioned adjacent to said expander means and having a fastener opening therethrough;
    fastener means extending through said fastener opening and adjustable attached to said wedge shaped means;
    a turnable head connected to said fastener means and in contact with said support plate means;
    clamping means adjustably coupled to said wedge shaped means adapted to draw said wedge shaped means against said expander means forcing said expander means in anchoring contact with the edge of said opening, said clamping means comprised of, in combination:

a threaded hole in said wedge shaped means;

external threads upon said fastener means in screw engagement with said threaded hole in said wedge shaped means;

an anchor retaining member attached to said fastener means;

whereby rotating said turntable head will cause said wedge shaped means to bear against said expander means forcing said expander means outwardly against the edge of said opening.

13. The tie down anchor as claimed in claim 12, in which said rail retainer means is comprised of pins extending through said slide rail and secured thereto.

* * * * *